United States Patent
Kim et al.

(10) Patent No.: US 11,275,552 B2
(45) Date of Patent: Mar. 15, 2022

(54) DISPLAY DEVICE AND SURROUND SOUND SYSTEM

(71) Applicant: LG ELECTRONICS INC., Seoul (KR)

(72) Inventors: Taeyoung Kim, Seoul (KR); Sijin Kim, Seoul (KR); Eunjung Lee, Seoul (KR); Minjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/752,501

(22) Filed: Jan. 24, 2020

(65) Prior Publication Data

US 2021/0034321 A1 Feb. 4, 2021

(30) Foreign Application Priority Data

Aug. 2, 2019 (KR) .................. 10-2019-0094550

(51) Int. Cl.
*G06F 3/16* (2006.01)
*H04R 3/12* (2006.01)
*H04R 1/26* (2006.01)

(52) U.S. Cl.
CPC .............. *G06F 3/165* (2013.01); *H04R 1/26* (2013.01); *H04R 3/12* (2013.01); *H04R 2430/01* (2013.01); *H04R 2499/15* (2013.01)

(58) Field of Classification Search
None
See application file for complete search history.

(56) References Cited

U.S. PATENT DOCUMENTS

| 8,050,425 | B2 | 11/2011 | Iwamatsu | |
|---|---|---|---|---|
| 9,507,559 | B2 | 11/2016 | Kim et al. | |
| 2002/0181718 | A1 | 12/2002 | Kato et al. | |
| 2007/0077020 | A1* | 4/2007 | Takahama | H04S 3/008 386/339 |
| 2009/0147134 | A1 | 6/2009 | Iwamatsu | |
| 2011/0317069 | A1* | 12/2011 | McRae | H04N 5/60 348/552 |
| 2012/0120270 | A1* | 5/2012 | Li | H04N 21/439 348/222.1 |

(Continued)

FOREIGN PATENT DOCUMENTS

| JP | 2002354600 | 12/2002 |
|---|---|---|
| JP | 2009130643 | 6/2009 |

(Continued)

OTHER PUBLICATIONS

PCT International Application No. PCT/KR2020/000682, International Search Report dated Apr. 27, 2020, 3 pages.

*Primary Examiner* — James K Mooney
(74) *Attorney, Agent, or Firm* — Lee Hong Degerman Kang Waimey

(57) ABSTRACT

A display device is provided to adjust sound balance between an internal speaker of the display device and an external speaker connected with the display device such that a user effectively feels a 3D sound effect. The display device includes a display, an audio output unit configured to output a sound, a wireless communication unit connected with at least one external speaker, and a controller configured to adjust speaker balance between the sound output from the audio output unit and a sound output from the external speaker.

19 Claims, 13 Drawing Sheets

(56) References Cited

U.S. PATENT DOCUMENTS

| | | |
|---|---|---|
| 2015/0249890 A1 | 9/2015 | Kim et al. |
| 2017/0048615 A1* | 2/2017 | Son .................... H03G 3/32 |
| 2017/0185373 A1* | 6/2017 | Kim .................. G06F 3/0488 |
| 2017/0325028 A1* | 11/2017 | Lee .................... H04R 3/12 |

FOREIGN PATENT DOCUMENTS

| | | |
|---|---|---|
| JP | 2009194893 | 8/2009 |
| KR | 1020080055303 | 6/2008 |
| KR | 1020150102337 | 9/2015 |

* cited by examiner

FIG. 12A

| Setting volume | PCM control volume | PCM gain |
|---|---|---|
| 0 | 0 | -1 dB |
| 1 | -30 dB | |
| ... | ... | |
| 50 | -15 dB | |
| ... | ... | |
| 70 | -10 dB | |
| ... | ... | |
| 100 | 0 dB | |

DISPLAY DEVICE AND SURROUND SOUND SYSTEM

CROSS-REFERENCE TO RELATED APPLICATIONS

Pursuant to 35 U.S.C. § 119(a), this application claims the benefit of earlier filing date and right of priority to Korean Patent Application No. 10-2019-0094550, filed on Aug. 2, 2019, the contents of which are hereby incorporated by reference herein in its entirety.

BACKGROUND

The present disclosure relates to a display device and a surround sound system including the same, and more particularly to a display device connected with a plurality of speakers and a surround sound system including the same.

Recently, there are increased needs that general users using television to listen to audio content having excellent sounds, as audio technologies have been developed as well as video technologies.

Accordingly, a user may connect several speakers with a TV, and the TV may provide a stereophonic sound for the user through an internal speaker and the several speakers connected with the TV. In other words, the TV may not only output a sound through at least one channel of the internal speaker, but also output a sound through at least one channel of an external speaker, thereby providing the sense of realism for the user.

For example, the TV may output a front-left sound and a front-right sound through the internal speaker, and may output a rear-left sound and a rear-right sound through the external sound, thereby providing four channels.

Meanwhile, when the level of any one of a sound output through the internal speaker and a sound output through the external speaker is excessively greater than or smaller than the level of a remaining one, the stereoscopic sound effect may be degraded.

In addition, when a plurality of external speakers connected with the TV are mutually different models or have mutually different environments, the balance between the external speakers is not maintained, so it is difficult to provide the optimal surround effect.

Accordingly, to provide the optimal sound effect for the user, the balance between the internal speaker of the TV and the external speaker and the balance between external speakers may need to be adjusted.

SUMMARY

The present disclosure is to provide a display device, capable of adjusting the balance between an internal speaker of the display device and an external speaker connected with the display device, and a surround sound system including the same.

The present disclosure is to provide a display device, capable of adjusting balance between a plurality of external speakers when a plurality of external speakers are connected with the display device, and a surround sound system including the same.

The present disclosure is to provide a display device, capable of adjusting speaker balance and surround balance by adjusting the output volume of an external speaker, and a surround sound system including the same.

The present disclosure is to provide a display device, capable of adjusting speaker balance or surround balance by applying a gain to a PCM signal transmitted to an external speaker, and a surround sound system including the same.

A display device according to an embodiment of the present disclosure comprises a display, an audio output unit configured to output a sound, a wireless communication unit connected with at least one external speaker, and a controller configured to adjust speaker balance between the sound output from the audio output unit and a sound output from the external speaker.

The controller is configured to adjust the speaker balance by adjusting an output volume of the external speaker.

The controller is configured to transmit, to the external speaker, a signal for adjusting the output volume to be lowered, when adjusting the speaker balance such that a level of the sound output from the audio output unit is greater than a level of the sound output from the external speaker, and transmit, to the external speaker, a signal for adjusting the output volume to be raised, when adjusting the speaker balance such that the level of the sound output from the audio output unit is less than the level of the sound output from the external speaker.

The controller is configured to adjust the speaker balance by adjusting a pulse code modulation (PCM) signal transmitted to the external speaker.

The controller is configured to adjust the speaker balance by applying a gain to the PCM signal.

The controller is configured to adjust the speaker balance by adjusting the PCM signal transmitted to the external speaker, when a setting volume of the external speaker is not adjustable.

The controller is configured to control the display to display a speaker balance adjusting icon for adjusting the speaker balance.

The controller is configured to adjust a surround balance between a plurality of external speakers when the plurality of external speakers are connected through the wireless communication unit.

The controller is configured to control the display to display a surround balance adjusting icon for adjusting the surround balance.

The controller is configured to adjust the surround balance when the plurality of external speakers are different from each other in maximum power.

The controller is configured to adjust the surround balance by adjusting a gain of a PCM signal of at least one of the plurality of external speakers.

The display device according to an embodiment of the present disclosure further comprises a storage to store a volume table in which the setting volume, a PCM control volume based on the setting volume, and a PCM gain are mapped to each other.

The controller is configured to store the volume table differently depending on a type of the external speaker.

The controller is configured to correct a PCM signal transmitted to the external speaker such that an output volume of the external speaker is equal to or less than a maximum volume, when adjusting the PCM signal transmitted to the external speaker.

A surround sound system according to an embodiment of the present disclosure comprising a plurality of external speakers, and a display device connected with the plurality of external speakers, wherein the display device includes a display, an audio output unit configured to output a sound, and a controller configured to adjust a speaker balance between the sound output from the audio output unit and a sound output from the external speaker.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 12A is a view illustrating a volume table to describe the method that the display device adjusts the sound level of the external speaker, according to an embodiment of the present disclosure.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
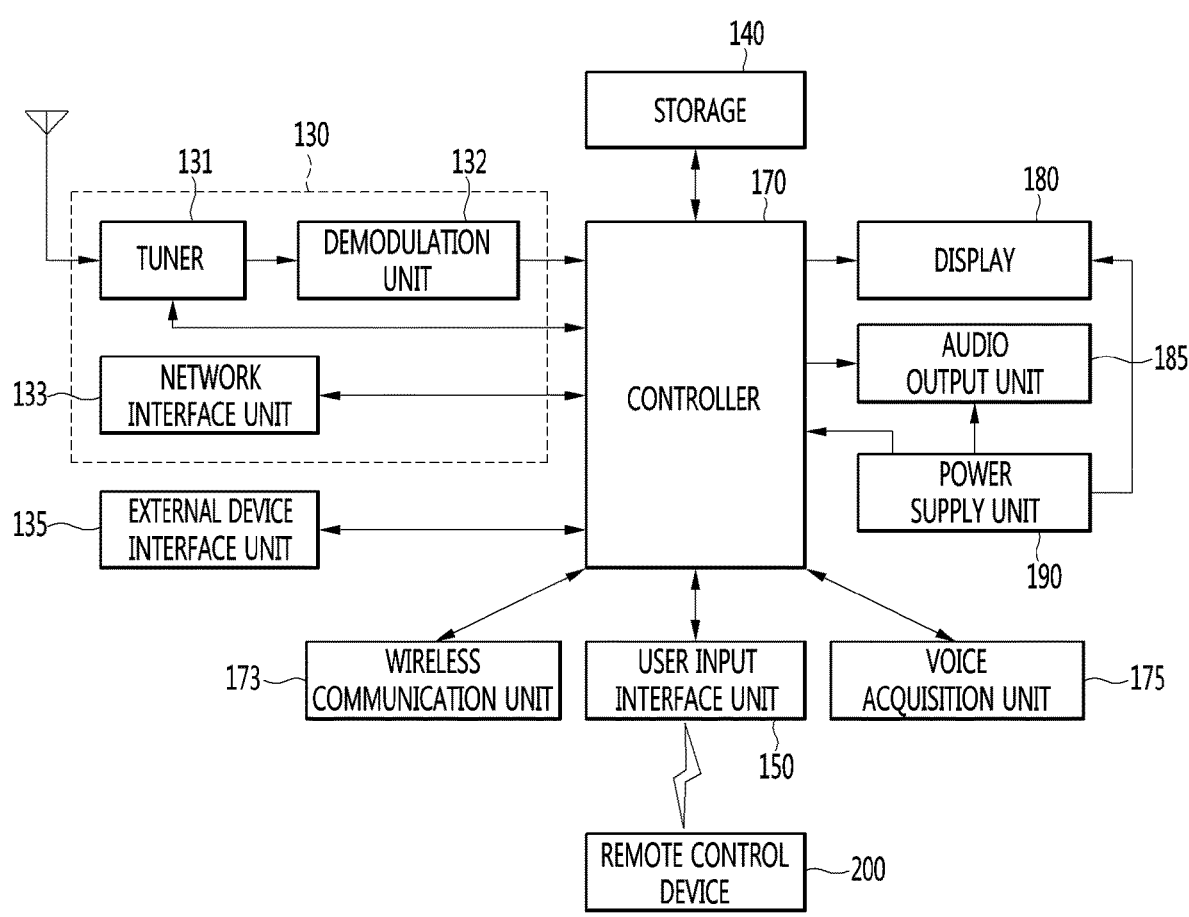
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage 140, a user input interface unit 150, a controller 170, a wireless communication unit 173, a voice acquisition unit 175, a display 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display 180. A sound signal of an external device inputted through the external device interface unit 135 can be outputted through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface unit 135 or the network interface unit 133 and can store information on a predetermined image through a channel memory function.

The storage 140 can store an application or an application list inputted from the external device interface unit 135 or the network interface unit 133.

The display device 100 can play content files (for example, video files, still image files, music files, document files, application files, and so on) stored in the storage 140 and provide them to a user.

The user input interface unit 150 can deliver signals inputted from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface unit 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface unit 135.

Voice signals processed in the controller 170 can be outputted to the audio output unit 185. Additionally, voice signals processed in the controller 170 can be inputted to an external output device through the external device interface unit 135.

Besides that, the control module 170 can control overall operations in the display device 100.

Additionally, the controller 170 can control the display device 100 by a user command or internal program inputted through the user input interface unit 150 and download a desired application or application list into the display device 100 in access to network.

The controller 170 can output channel information selected by a user together with processed image or voice signals through the display 180 or the audio output unit 185.

Additionally, according to an external device image playback command received through the user input interface unit 150, the controller 170 can output image signals or voice signals of an external device such as a camera or a camcorder, which are inputted through the external device interface unit 135, through the display 180 or the audio output unit 185.

Moreover, the controller 170 can control the display 180 to display images and control broadcast images inputted through the tuner 131, external input images inputted through the external device interface unit 135, images inputted through the network interface unit, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication unit 173. Accordingly, a user of the wearable device can use the data processed in the display device 100 through the wearable device.

The voice acquisition unit 175 can acquire audio. The voice acquisition unit 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output unit 185.

The audio output unit 185 receives the audio processed signal from the controller 170 and outputs the sound.

The power supply unit 190 supplies the corresponding power throughout the display device 100. In particular, the power supply unit 190 supplies power to the controller 170 that can be implemented in the form of a System On Chip (SOC), a display 180 for displaying an image, and the audio output unit 185 for outputting audio or the like.

Specifically, the power supply unit 190 may include a converter for converting an AC power source into a DC power source, and a dc/dc converter for converting a level of the DC source power.

Figure 2:
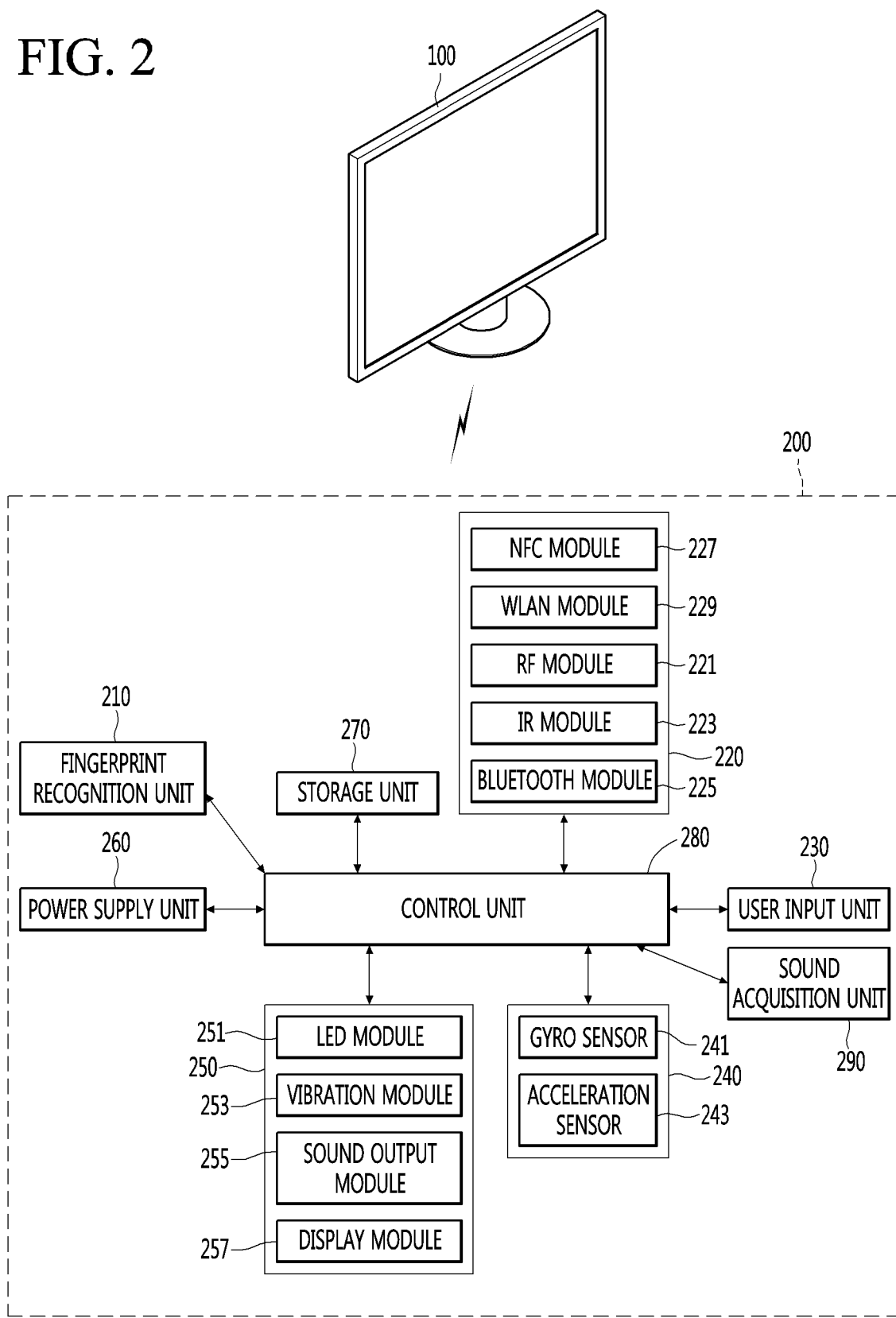
FIG. 2 is a block diagram illustrating a remote control device according to an embodiment of the present disclosure.
Figure 3:
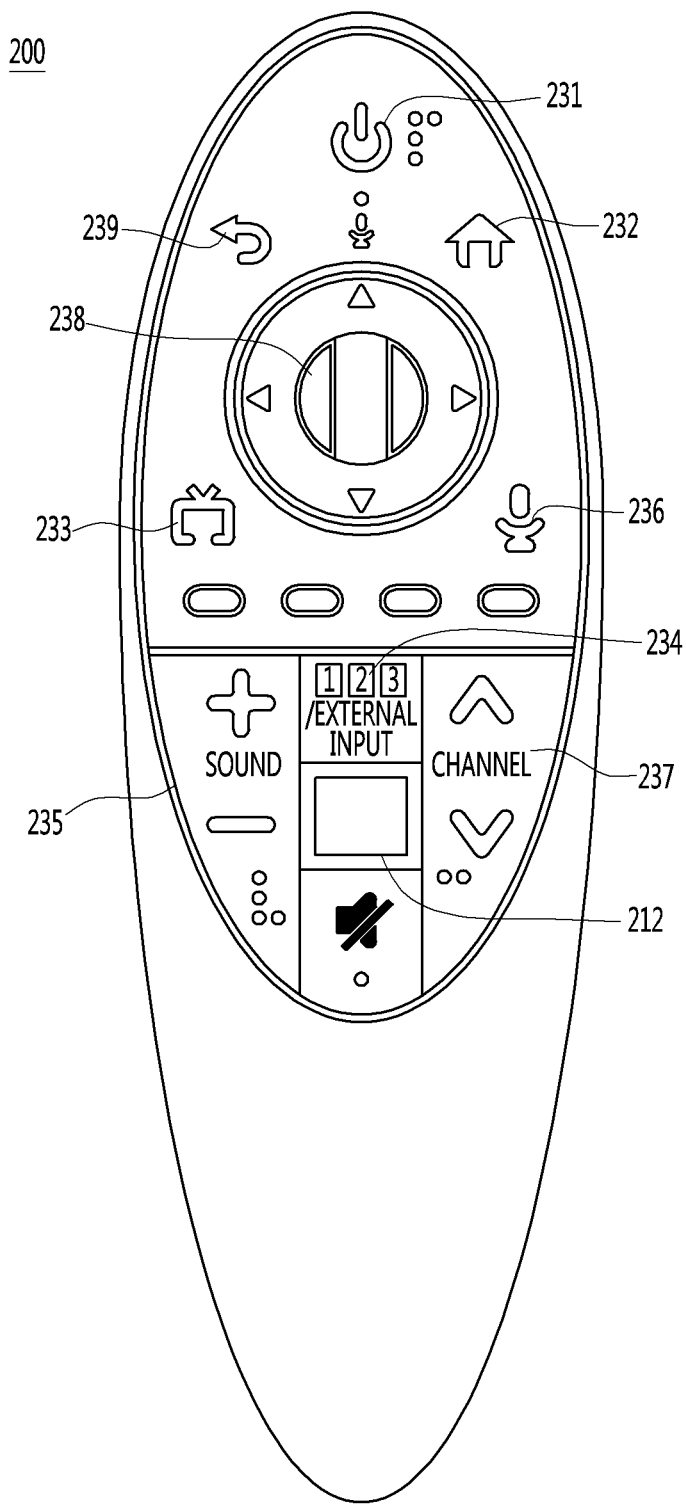
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage 270, a control unit 280, and a voice acquisition unit 290.

Referring to FIG. 2, the wireless communication unit 225 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
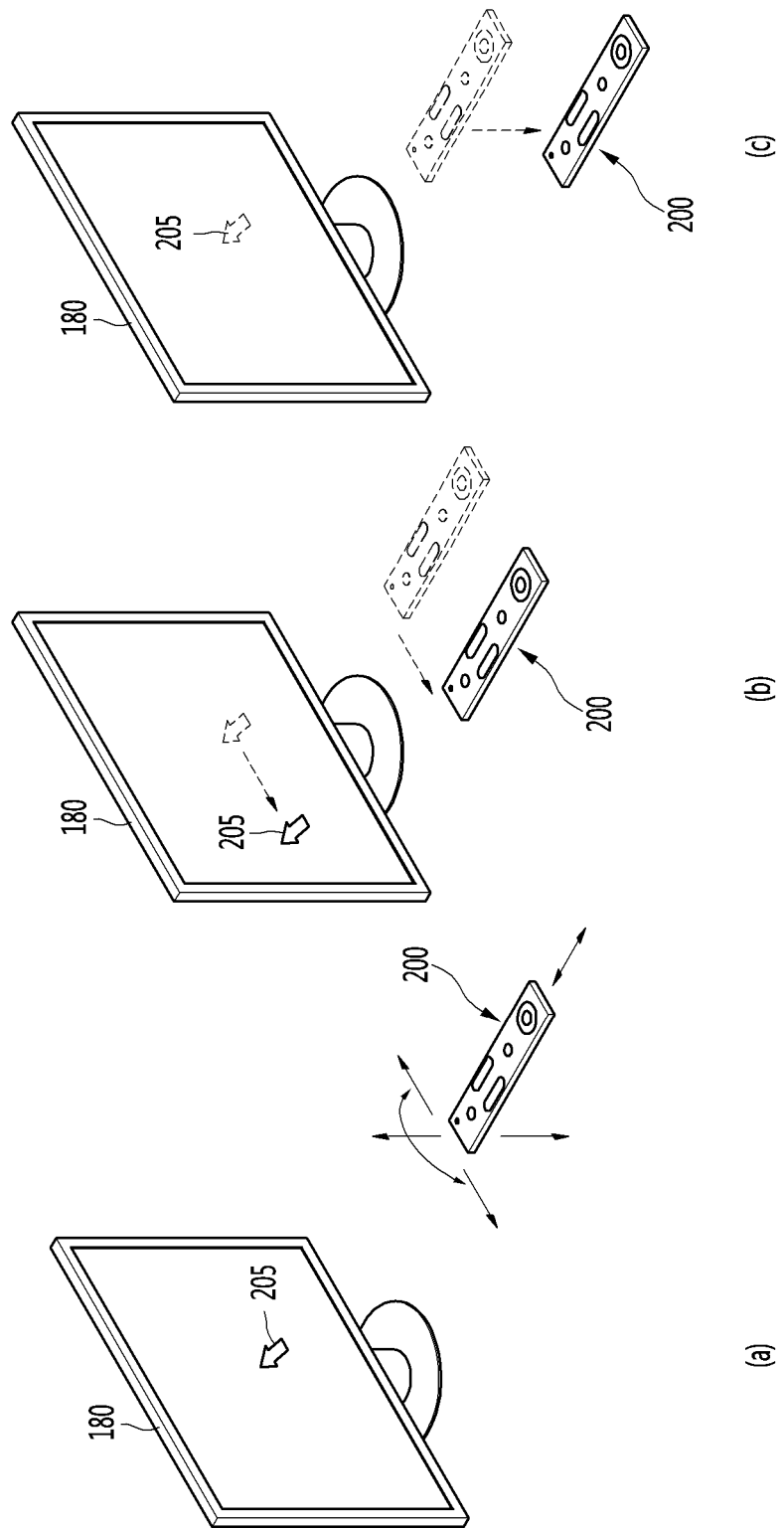
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
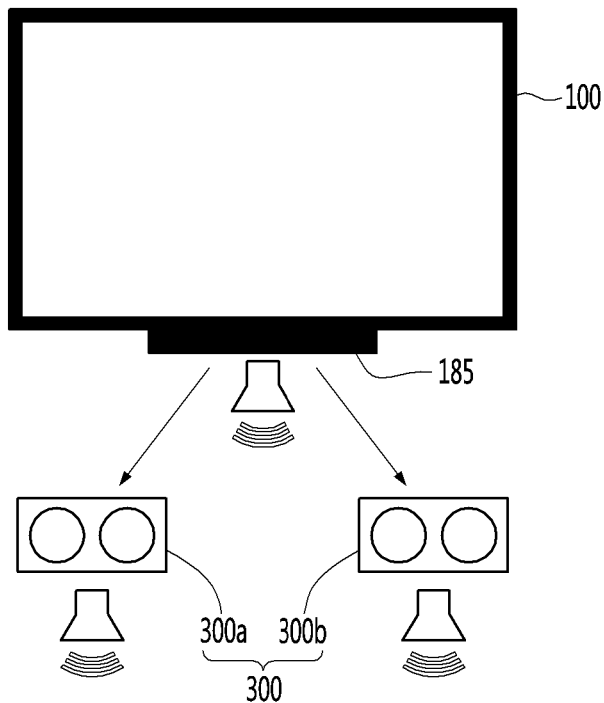
FIG. 5 is a view illustrating a surround sound system according to an embodiment of the present disclosure.

FIG. 5 is a view illustrating a surround sound system according to an embodiment of the present disclosure.

The surround sound system according to an embodiment of the present disclosure may include a display device 100 and at least one external speaker 300. The display device 100 may be THE display device described with reference to FIGS. 1 to 4. The external speaker 300 may be a speaker connected with the display device 100 in a wired manner or a wireless manner.

Hereinafter, although the external speaker 300 is assumed as a speaker connected with the display device 100 through Bluetooth, this is provided only for the illustrative purpose, and the present disclosure is not limited thereto.

Similarly, although the external speaker 300 is assumed as including a first external speaker 300a and a second external speaker 300b, this is provided only for the illustrative purpose, and the present disclosure is not limited thereto. In other words, various numbers of external speakers 300 may be connected with the display device 100.

When the display device 100 is connected with the first external speaker 300a and the second external speaker 300b, the first external speaker 300a may be a Rear Left speaker to output a sound corresponding to a rear left side and the second external speaker 300b may be a Rear Right speaker to output a sound corresponding to a rear right side.

In addition, the audio output unit 185 of the display device 100 may be a stereo-type speaker to output a sound corresponding to a front left side and a sound corresponding to a front right side. The audio output unit 185 may be an internal speaker of the display device 100.

The balance between the internal speaker and the external speaker may be maintained, and the balance between the external speakers may be maintained, such that the surround sound system provides the optimal surround three-dimensional effect for a user.

However, when the level of any one of the sound output through the internal speaker and the sound output through the external speaker is greater than or less than the level of a remaining one, the balance may not be maintained.

In addition, when the model of the first external speaker 300a differs from the model of the second external speaker 300b, the left and right balance may not be maintained.

In addition, even if the first external speaker 300a and the second external speaker 300b have the same models, the balance between the first external speaker 300a and the second external speaker 300b may not be maintained due to the installation positions of the first external speaker 300a and the second external speaker 300b, or obstacles or distances between the first external speaker 300a and the second external speaker 300b.

Conventionally, a user used to personally manipulate each of the internal speaker or the external speaker while personally listening to a test sound, so as to maintain the balance between the internal speaker and the external speaker or the balance between the external speakers. However, this case may cause the user to feel uncomfortable because the user has to individually control the speakers.

Accordingly, the present disclosure is to provide a surround sound system capable of adjusting balance through the cooperation between the internal speaker and at least one external speaker.

Hereinafter, the balance between the internal speaker and the external speaker is referred to as 'speaker balance', and the balance between the external speakers is referred to as 'surround balance'. The balance may be referred to as at least one of 'speaker balance' or 'surround balance'.

Figure 6:
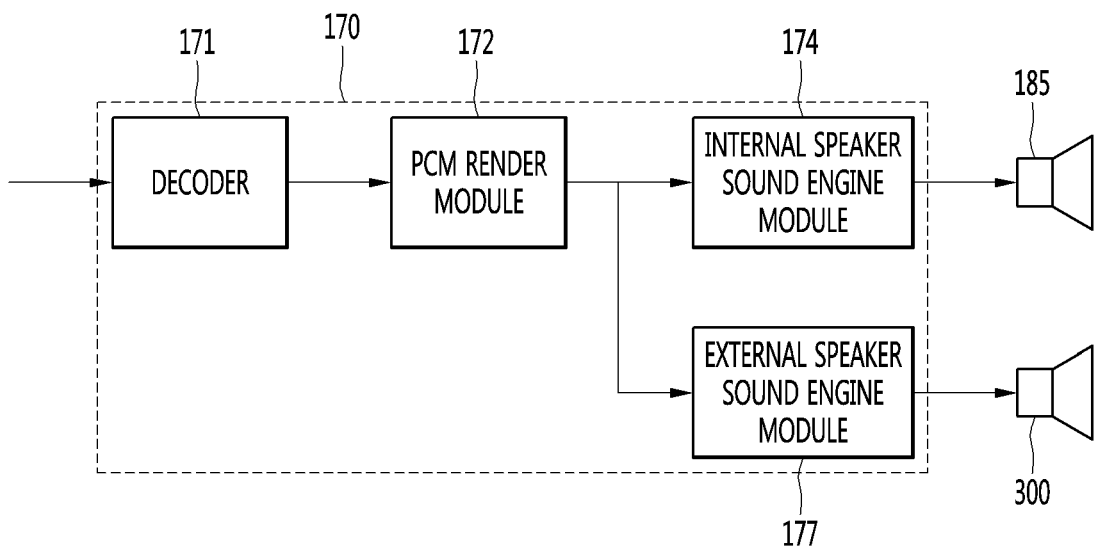
FIG. 6 is a block diagram illustrating a detailed configuration of the controller illustrated in FIG. 1.

FIG. 6 is a block diagram illustrating a detailed configuration of the controller illustrated in FIG. 1.

The controller 170 may include a decoder 171, a PCM render module 172, an internal speaker sound engine module 174, and an external speaker sound engine module 177.

The decoder 171 may decode an audio signal corresponding to an image.

The PCM render module 172 may convert the decoded audio signal into a PCM signal.

The PCM signal may include data obtained through Pulse Code Modulation (PCM) conversion such that the decoded audio signal is transmitted to the audio output unit 185 or the external speaker 300.

The PCM manner may be a manner of converting an analog signal into a digital bitstream through sampling, quantizing, and coding, and of transmitting the converted signal.

The PCM render module 172 may transmit the converted PCM signal to the internal speaker sound engine module 174 and the external speaker sound engine module 177.

The internal speaker sound engine module 174 may apply a sound field effect suitably to a sound to be output from the audio output unit 185.

The internal speaker sound engine module 174 may process the volume in response to the PCM signal and send the PCM signal to an amplifier (not illustrated) such that the PCM signal is amplified based on the processed volume. The audio output unit 185 may output the sound amplified by the amplifier (not illustrated).

The external speaker sound engine module 177 may apply a sound field effect suitably to a sound to be output from the external speaker 300. In addition, the external speaker sound engine module 177 may filter only components necessary for a surround sound.

The external speaker sound engine module 177 may transmit a surround sound to the external speaker 300 through Bluetooth communication. The external speaker 300 may output a surround sound received through the external speaker sound engine module 177.

Meanwhile, the external speaker sound engine module 177 may apply a gain to each channel before transmitting the sound to the external speaker 300. In other words, the external speaker sound engine module 177 may apply the same gain or different gains to the external speakers 300.

The external speaker sound engine module 177 may convert data of the PCM signal such that a gain is applied to a PCM signal received from the PCM render module 172, and then may transmit the converted data to the external speaker 300.

The gain may refer to the level of the sound necessary to be adjusted depending on balance setting information.

The controller 170 may further include a balance controller 400.

Figure 7:
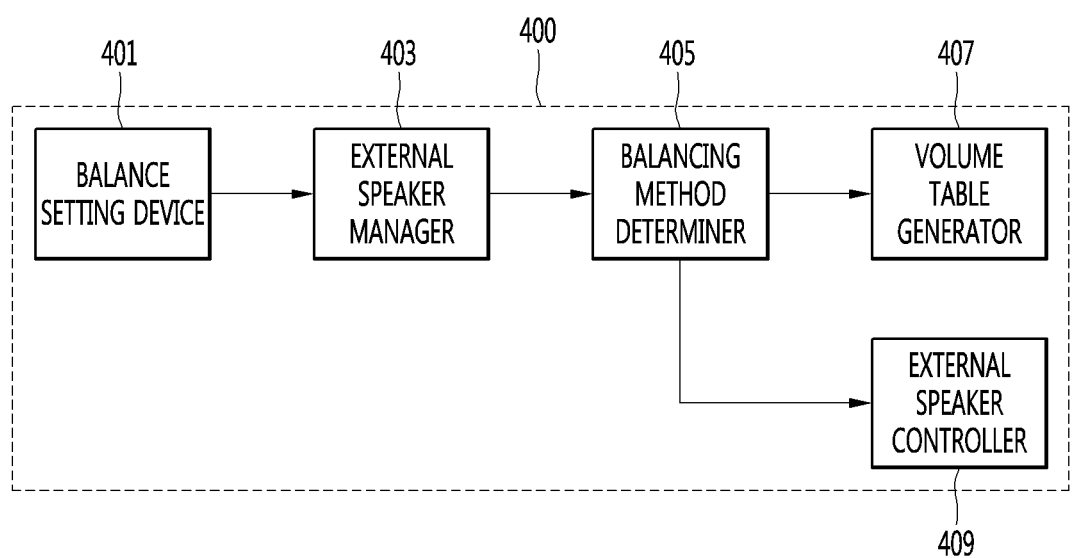
FIG. 7 is a block diagram illustrating a detailed configuration of the balance controller according to an embodiment of the present disclosure.

FIG. 7 is a block diagram illustrating a detailed configuration of the balance controller according to an embodiment of the present disclosure.

The balance controller 400 includes at least some or all of balance setting unit 401, an external speaker manager 403, a balancing method determiner 405, a volume table generator 407, and an external speaker controller 409.

The balance setting unit 401 may receive information (level adjusting information) for adjusting the level for speaker balance or surround balance.

For example, the balance setting unit 401 may receive an input for adjusting the sound level of any one of the internal speaker and the external speaker to be greater or less than the sound level of a remaining one of the internal speaker and the external speaker. For another example, the balance setting unit 401 may receive an input for adjusting the sound level of any one of the external speakers to be greater than or less than the sound level of another external speaker of the external speakers.

A method that the balance setting unit 401 receives the level adjusting information will be described again with reference to FIG. 9 later.

The external speaker manager may store connection information and setting information of the external speaker 300. The external speaker manager 403 may store connection information and setting information of an external speaker 300 that was connected with the display device 100 or that is being connected with the display device 100.

The setting information may include an output volume and a volume table of each external speaker 300.

The balancing method determiner 405 may determine a method for adjusting the output volume of the external speaker 300. The balancing method determiner 405 may adjust the output volume of the external speaker 300 by adjusting the device volume of the external speaker 300 or applying a gain to the PCM signal transmitted to the external speaker 300.

The balancing method determiner 405 may control the external speaker controller 409 such that the external speaker 300 changes the device volume, when determining the method for adjusting the device volume of the external speaker 300, as a method for adjusting the output volume of the external speaker 300. The external speaker controller 409 may transmit a signal, which is used for controlling the external speaker 300 to change the device volume, to the external speaker 300.

The balancing method determiner 405 may control the volume table generator 407 to generate a volume table, when determining the method for applying the gain to the PCM signal as the method for adjusting the output volume of the external speaker 300. The volume table generator 407 may determine a gain, which is used for adjusting the speaker balance or the surround balance, for each external speaker 300 and may generate the volume table based on the determined gain. The volume table will be described in detail with reference to FIGS. 12A to 12C.

The volume table generator 407 may transmit the generated volume table to the external speaker sound engine module 177. The external speaker sound engine module 177 may apply a gain to the PCM signal based on the volume table, and transmit, to the external speaker 300, the PCM signal converted based on the application of the gain.

Figure 8:
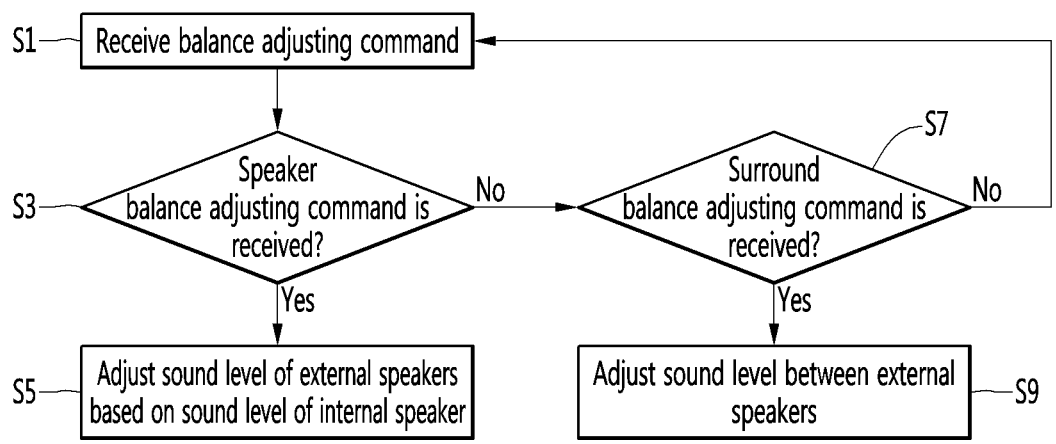
FIG. 8 is a flowchart illustrating a method of operating a display device according to an embodiment of the present disclosure.

FIG. 8 is a flowchart illustrating a method of operating a display device according to an embodiment of the present disclosure.

The controller 170 may receive a command (balance adjusting command) for adjusting balance.

The display 180 may display a screen (balance adjusting screen) for adjusting balance, and the controller 170 may receive a balance adjusting command through the user input interface unit 150 in the state that the balance adjusting screen is displayed.

The balance adjusting command may be a command (speaker balance adjusting command) for adjusting the speaker balance or a command (surround balance adjusting command) for adjusting the surround balance.

The controller 170 may receive at least one of the speaker balance adjusting command and the surround balance adjusting command.

The controller 170 may determine whether the speaker balance adjusting command is received (S3) and may determine whether the surround balance adjusting command is received (S7).

Meanwhile, the sequences of the step of determining whether the speaker balance adjusting command is received and the step of determining whether the surround balance adjusting command is received may be changed.

When the speaker balance adjusting command is received, the controller 170 may adjust the sound level of the external speakers based on the sound level of the internal speaker (S5).

When the speaker balance adjusting command is received, the controller 170 may simultaneously adjust a plurality of external speakers 300 such that the output volumes of the plurality of external speakers 300 may be increased or decreased by equal volume levels.

In detail, when the speaker balance adjusting command is received, the controller 170 may set speaker balance such that the sound of the external speaker is increased or decreased based on the sound of the internal speaker in response to the speaker balance adjusting command, and may adjust the output volume of the external speaker 300 based on the set speaker balance.

Meanwhile, when the surround balance adjusting command is received, the controller 170 may adjust the sound level between the external speakers 300 (S9).

When the surround balance adjusting command is received, the controller 170 may control at least one of the plurality of external speakers 300 such that the output volume of any one of the plurality of external speakers 300 is increased or decreased as compare to the output volume of another speaker of the plurality of external speakers.

In detail, when receiving the surround balance adjusting command, the controller 170 may set the surround balance such that the sound of any one of the plurality of external speakers 300a and 300b is decreased or increased based on the sound of another one of the plurality of external speakers 300a and 300b, in response to the surround balance adjusting command, and may adjust the output volume of the external speaker 300 based on the set sound balance.

For example, when the plurality of external speakers 300 has various maximum powers, the controller 170 may adjust the surround balance.

Figure 9:
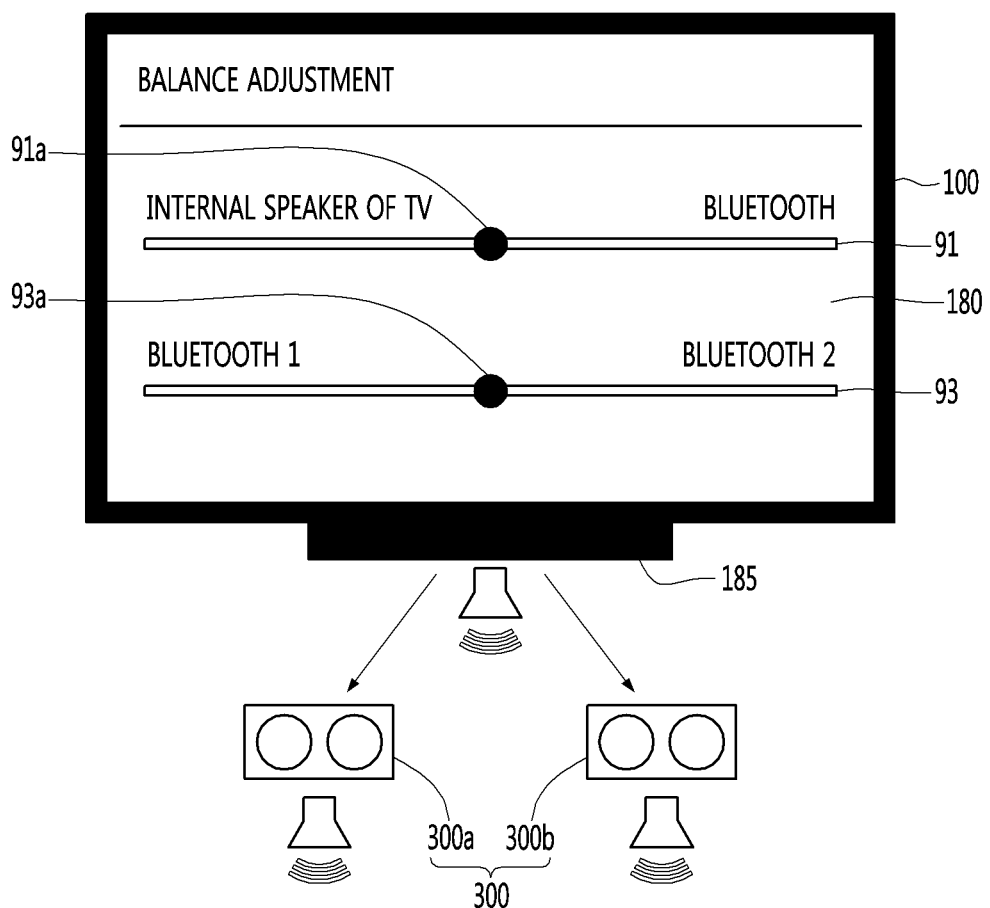
FIG. 9 is a view illustrating the balance adjusting screen displayed by the display device according to an embodiment of the present disclosure.

FIG. 9 is a view illustrating the balance adjusting screen displayed by the display device according to an embodiment of the present disclosure.

The balance adjusting screen may include at least one of a speaker balance adjusting icon 91 or a surround balance adjusting icon 93.

The display 180 may display at least one of the speaker balance adjusting icon 91 or the surround balance adjusting icon 93.

The speaker balance adjusting icon 91 may be an icon for increasing or decreasing the sound level of the external speaker 300 based on the sound level of the internal speaker.

The sound of the internal speaker may refer to the level of the sound output through the audio output unit 185. The sound level of the internal speaker may be varied depending on the setting volume of the display device 100.

A first end of the speaker balance adjusting icon 91 may indicate the internal speaker (the internal speaker of the TV) and a second end of the speaker balance adjusting icon 91 may indicate an external speaker ('Bluetooth'). The second end may be positioned in opposite to the first end. The speaker balance adjusting icon 91 may include an indicator 91a.

The controller 170 may receive a command for changing the position of the indicator 91a through the user input interface unit 150. The controller 170 may set the speaker balance such that the sound of the external speaker is decreased based on the sound of the internal speaker as the indicator 91a approaches the first end of the first and second ends and may set the speaker balance such that the sound of the external speaker is increased based on the sound of the internal speaker, as the indicator 91a approaches the second end of the first and second ends.

The surround balance adjusting icon 93 may be an icon to increase or decrease the sound level of any one of the external speakers 300a and 300b based on the sound level of a remaining one of the external speakers 300a and 300b.

The first end of the surround balance adjusting icon 93 may indicate the first external speaker 300a (Bluetooth 1') and the second end of the surround balance adjusting icon 93 may indicate the second external speaker 300b (Bluetooth 2). Similarly, the second end is positioned in opposition to the first end, and the surround balance adjusting icon 93 may include an indicator 93a.

The controller 170 may receive a command for changing the position of an indicator 93a on the surround balance adjusting icon 93 through the user input interface unit 150. The controller 170 may set the surround balance such that the sound of the first external speaker 300a is more increased as compared to the sound of the second external speaker 300b as the indicator 93a approaches the first end of the first and second ends. The controller 170 may set the surround balance such that the sound of the second external speaker 300b is more increased as compared to the sound of the first external speaker 300a as the indicator 93a approaches the second end of the first end and the second end.

After setting the speaker balance or the surround balance, the controller 170 may adjust the output volume of at least one of the plurality of external speakers 300 according to the speaker balance or the surround balance.

When the speaker balance is set, the controller 170 may adjust the output volumes of all external speakers 300.

When the surround balance is set, the controller 170 may adjust the output volumes of some of the external speakers 300.

In addition, when adjusting the output volume of the external speaker 300, the controller 170 may first determine whether the device volume of the external speaker 300 is able to be adjusted. When the device volume of the external speaker 300 is able to be adjusted, the controller 170 may adjust the output volume of the external speaker 300 through a command for adjusting the device volume of the external speaker 300.

When the device volume of the external speaker 300 is not able to be adjusted, the controller 170 may adjust the output volume of the external speaker 300 by applying a gain to the PCM signal transmitted to the external speaker 300.

Alternatively, although the controller 170 may adjust the device volume of the external speaker 300, when the device volume corresponds to the maximum (max) volume or the minimum (min) volume, the controller 170 applies a gain to the PCM signal transmitted to the external speaker 300, thereby adjusting the output volume of the external speaker 300.

In this case, the output volume of the external speaker 300 may refer to the volume of the sound directly output from the external speaker 300. The output volume of the external speaker 300 may be determined based on the device volume of the external speaker 300 and the data of the PCM signal transmitted to the external speaker 300.

The device volume of the external speaker 300 may refer to a volume size set in the external speaker 300. In other words, the device volume of the external speaker 300 may be distinguished from the setting volume of the display device 100.

Figure 10:
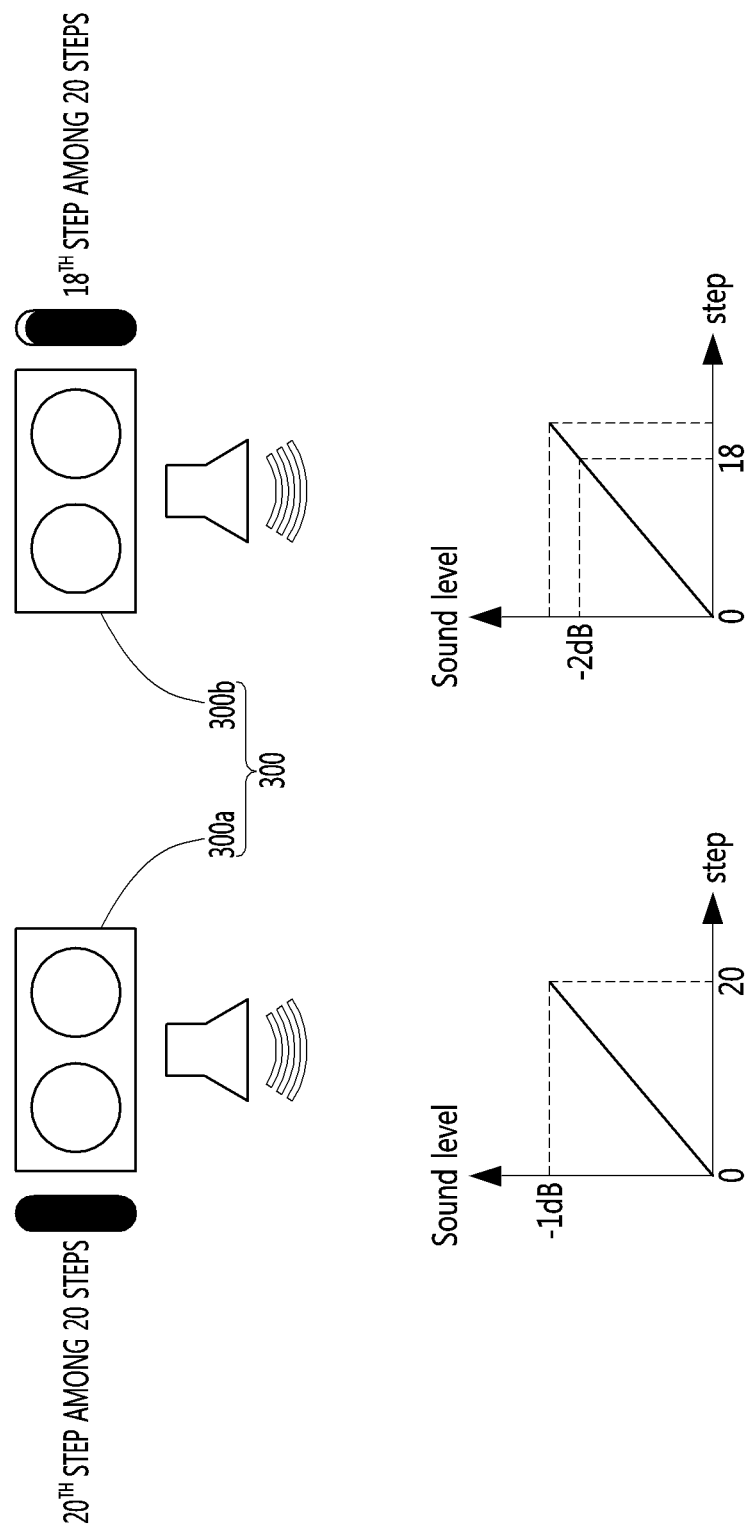
FIG. 10 is a view illustrating that the display device adjusts the device volume of the external speaker according to an embodiment of the present disclosure.

FIG. 10 is a view illustrating that the display device adjusts the device volume of the external speaker according to an embodiment of the present disclosure.

Referring to FIG. 10, the device volume of the external speaker 300 may be set to any one step from first step to 20th step. However, the 20 steps are provided for the illustrative purpose, and the present disclosure is not limited thereto.

For example, the controller 170 may receive the surround balance adjusting command to change the position of the indicator 93a on the surround balance adjusting icon 93 to be at a first point closer to the first end of the first and second ends. In this case, the device volume of the first external speaker 300a may be set to the 20th step among 20 steps and the device volume of the second external speaker 300b may be set to the 18th step among the 20 steps. In this case, the first external speaker 300a may output the sound at the level of −1 dB, and the second external speaker 300b may output the sound at the level of −2 dB.

When receiving the surround balance adjusting command to change the position of the indicator 93a on the surround balance adjusting icon 93 to be at a second point closer to the first end as compared to the first point, the device volume of the first external speaker 300a may be set to the 20th step among 20 steps and the device volume of the second external speaker 300b may be set to a step lower than the 18th step among the 20 steps.

In other words, the controller 170 may control the external speaker controller 409 such that the device volume of the second external speaker 300b is more reduced as compared to the device volume of the first external speaker 300a, as the indicator 93a on the surround balance adjusting icon 93 approaches the first step.

Meanwhile, as described above, according to an embodiment, the controller 170 may adjust the surround balance by adjusting the device volume of any one (e.g., the second speaker 300b) of the external speakers 300a and 300b to be reduced. In addition, when the device volume of any one (e.g., the second external speaker 300b) of the external speakers 300a and 300b) is reduced to the minimum volume, the controller 170 may adjust the surround balance by increasing the device volume of another speaker 300a (e.g., the first external speaker 300a).

According to another embodiment, the controller 170 may adjust the surround balance by greatly adjusting the device volume of any one (e.g., the external speaker 300a) of the plurality of external speakers 300a and 300b. Further, in this case, when the device volume of any one (e.g., the first external speaker 300a) of the plurality of external speakers 300a and 300b is increased to the maximum volume, the controller 170 may adjust the surround balance by reducing the device volume of another one (e.g., the second external speaker 300b) of the plurality of external speakers 300a and 300b.

As described above, the controller 170 may change the output volumes of the first external speaker 300a and the second external speaker 300b by adjusting the device volumes of the first external speaker 300a and the second external speaker 300b.

Accordingly, it may be minimized to output the device volume of the first external speaker 300a and the device volume of the second external speaker 300b at mutually different sound levels even through the device volume of the first external speaker 300a is equal to the device volume of the second external speaker 300b, as the first external speaker 300a and the second external speaker 300b have mutually different models. Further, in this case, there may be overcome a problem that a user hears a sound at a sound level varied depending on the installation environments of the first external speaker 300a and the second external speaker 300b. In addition, a user may more easily adjust the sound balance between the external speakers 300a and 300b using the surround balance adjusting icon 93 even if the output volume of the first external speaker 300a and the output volume of the second external speaker 300b are not adjusted.

Meanwhile, the controller 170 may adjust the output volume of the external speaker 300 without limiting in the adjusting of the sound balance, by controlling the external speaker controller 409 to change the device volume of the external speaker 300, even if the speaker balance is adjusted.

The controller 170 may adjust the output volume of the external speaker by applying the gain to the PCM, when the device volume of the external speaker 300 is not controllable, or when the device volume of the external speaker 300 is not adjustable any more as the device volume of the external speaker 300 corresponds to the maximum/minimum volume, though the device volume of the external speaker 300 is controllable.

In other words, when the setting volume of the external speaker 300 is not adjustable, the controller 170 may adjust the speaker balance by adjusting the PCM signal transmitted to the external speaker 300.

Figure 11:
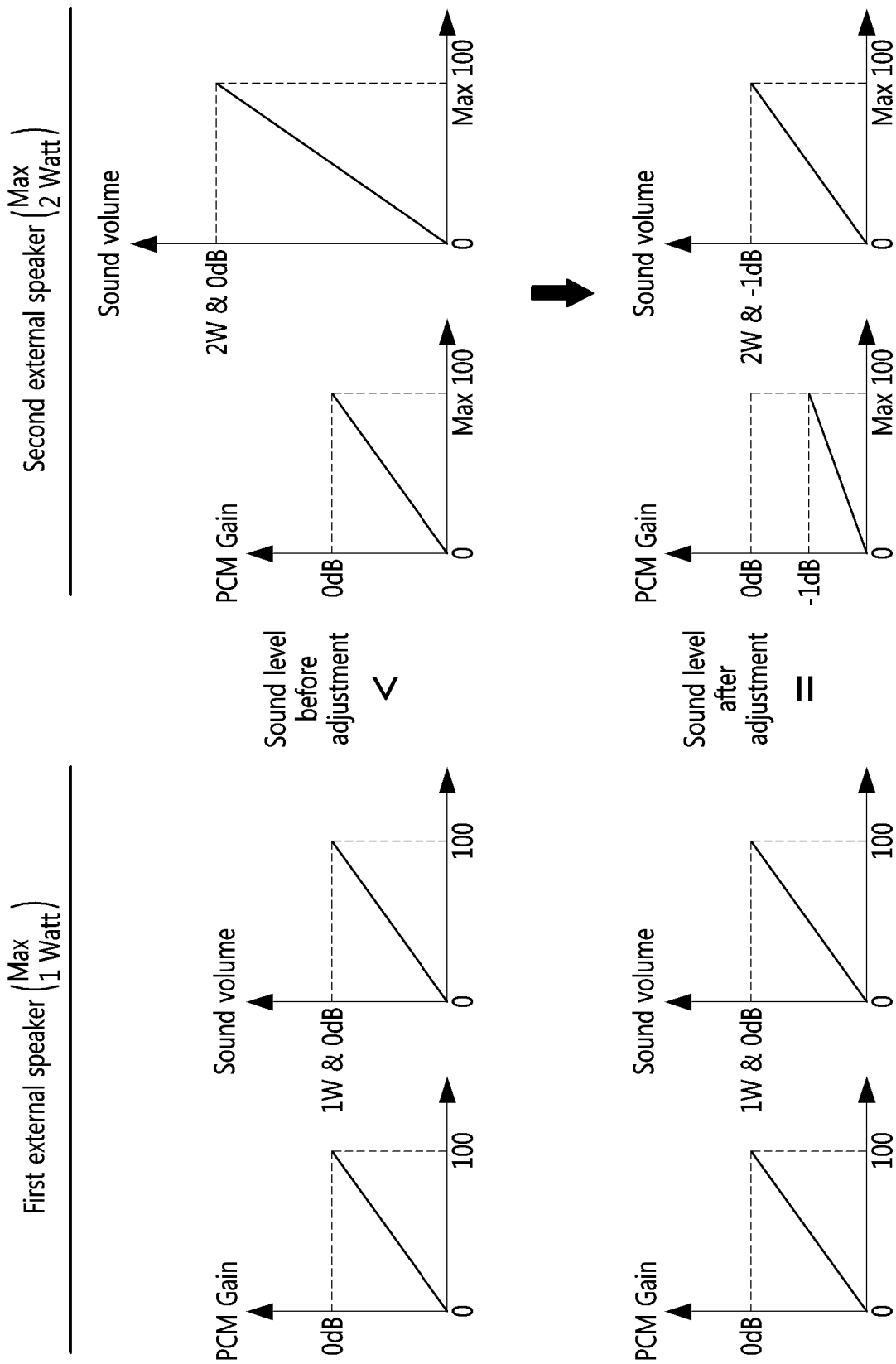
FIG. 11 is a view illustrating a method for applying a PCM signal gain in the display device according to an embodiment of the present disclosure.

FIG. 11 is a view illustrating a method for applying a PCM signal gain in the display device according to an embodiment of the present disclosure.

Referring to FIG. 11, the maximum power of the first external speaker 300a may be 1 Watt, and the maximum power of the second external speaker 300b may be 2 Watt. However, this is provided for the illustrative purpose, and the present disclosure is not limited thereto.

In addition, it is assumed that the setting volume of the display device 100 is any one from 0 to 100. The setting volume of the display device 100 may refer to the volume of the display device 100 set by the user.

For example, the controller 170 may adjust the PCM gain of the first external speaker 300a to be a value from 0 (or −x dB) to 0 dB when the setting volume of the display device 100 is increased to the value from 0 to 1000. Similarly, the controller 170 may adjust the PCM gain of the second external speaker 300b to be a value from 0 (or −x dB) to 0 dB when the setting volume of the display device 100 is increased to the value from 0 to 100. However, in this case, since the power of the first external speaker 300a is different from the power of the second external speaker 300b, the level of the sound output from the first external speaker 300a may be different from the level of the sound output from the second external speaker 300b.

When the setting volume of the controller 170 is increased to a value from 0 to 100, the controller 170 may change the PCM gain of the second external speaker 300b such that the PCM gain of the second external speaker 300b is increased to a value from 0 (or −x dB) to −1 dB. In this case, the sound level output from the second external speaker 300b is decreased, so the sound level output from the first external speaker 300a may be equal to the sound level output from the second external speaker 300b.

The PCM gain may indicate the sound level set to adjust the sound level output from the external speaker 300. For example, the PCM gain of −1 dB may refer to that the sound to be output from the external speaker 300 has to be adjusted by −1 dB.

FIG. 12A is a view illustrating a volume table to describe the method that the display device adjusts the sound level of the external speaker, according to an embodiment of the present disclosure.

When the setting volume of the display device 100 is in a value from 0 to 100, PCM control volumes may be mapped to relevant setting volumes, respectively. For example, when the setting volume of the display device 100 is 0, the PCM control volume is 0, which means that the PCM signal is generated such that the output volume of the external speaker 300 becomes 0. When the setting volume of the display device 100 is 1, the PCM control volume is −30 dB, which means that the PCM signal is generated such that the output volume of the external speaker 300 is −30 dB. Similarly, when the setting volume of the display device 100 is 100, the PCM control volume is 0 dB, which means that the PCM signal is generated such that the output volume of the external speaker 300 is 0 dB.

As described above, the controller 170 may store the volume table in which the setting volume of the display device 100 is mapped to the PCM control volume.

In addition, the controller 170 may generate a volume table in which a PCM gain is additionally mapped to the setting volume and the PCM control volume of the display device 100.

In this case, the volume table may include data obtained by mapping the setting volume, the PCM control volume based on the setting volume, and the PCM gain.

For example, when the setting volume of the display device 100 may be 1, the PCM control volume is −30 dB and the PCM gain is −1 dB, which means that the PCM signal is generated such that the output volume of the external speaker 300 is −31 dB. Similarly, when the setting volume of the display device 100 may be 100, the PCM control volume is 0 dB, and the PCM gain is −1 dB, which means that the controller 170 generates the PCM signal such that the output volume of the external speaker 300 is −1 dB.

As described above, the controller 170 may control the output volume from the external speaker 300 by generating the PCM signal based on the PCM gain when the data of the PCM signal transmitted to the external speaker is generated.

Meanwhile, in FIG. 12A, although the PCM gain is constant as −1 dB, this is provided for the illustrative purpose. The PCM gains may be set differently depending on the setting volume of the display device 100.

In addition, the controller 170 may variously store the volume table depending on the external speaker 300. For example, the controller 170 may store the volume table for the first external speaker 300a and the volume table for the second external speaker 300b.

Figure 12B:
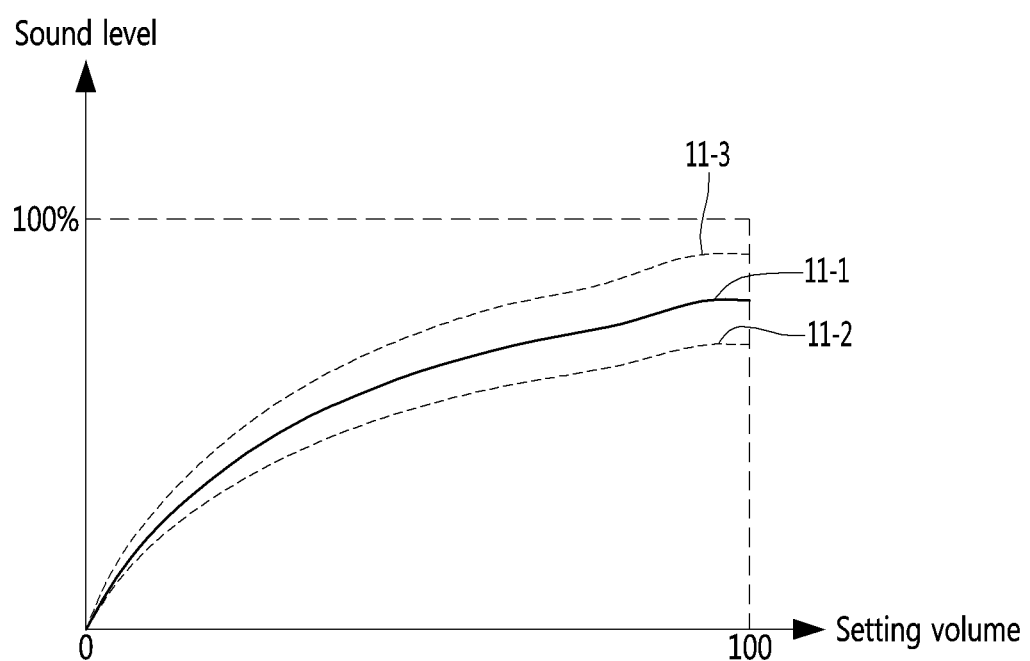
FIG. 12B is a view illustrating a PCM curve applied to the display device, according to an embodiment of the present disclosure.

FIG. 12B is a view illustrating a PCM curve applied to the display device, according to an embodiment of the present disclosure.

The PCM curve may refer to the level of the sound output from the external speaker 300 when the PCM signal is transmitted to the external speaker 300 with the PCM control volume based on the setting volume of the display device 100.

Such a PCM curve may be changed as the PCM gain is added to the volume table.

Referring to FIG. 12B, the first PCM curve 11-1 may be a curve indicating the output volume of the external speaker 300 in which only the PCM control volume is reflected. In addition, when the PCM gain is set such that the output volume of the external speaker 300 is decreased, the second curve 11-2 may be a curve indicating the output volume of the external speaker 300, and the third curve 11-3 may be a curve indicating the output volume of the external speaker 300 when the PCM gain is set such that the output volume of the external speaker 300 is increased.

For example, when receiving a speaker balance adjusting command for changing the position of the indicator 91a on the speaker balance adjusting icon 91 to be at the first point closer to the first end of the first and second ends, the controller 17 may change the PCM curve from the first curve 11-1 to the second curve 11-2.

To the contrast, when receiving a speaker balance adjusting command for changing the position of the indicator 91a on the speaker balance adjusting icon 91 to be at the second point closer to the second end of the first and second ends, the controller 17 may change the PCM curve from the first curve 11-1 to the third curve 11-2.

As described above, the controller 170 may adjust the output volume of the speaker 300 by applying the PCM gain when adjusting the speaker balance or the surround balance.

Meanwhile, as the PCM curve is changed, a saturation section in which the output volume of the external speaker 300 exceeds the maximum volume (100%) may be made. In this case, the controller 170 may correct the PCM curve to prevent the saturation section.

Figure 12C:
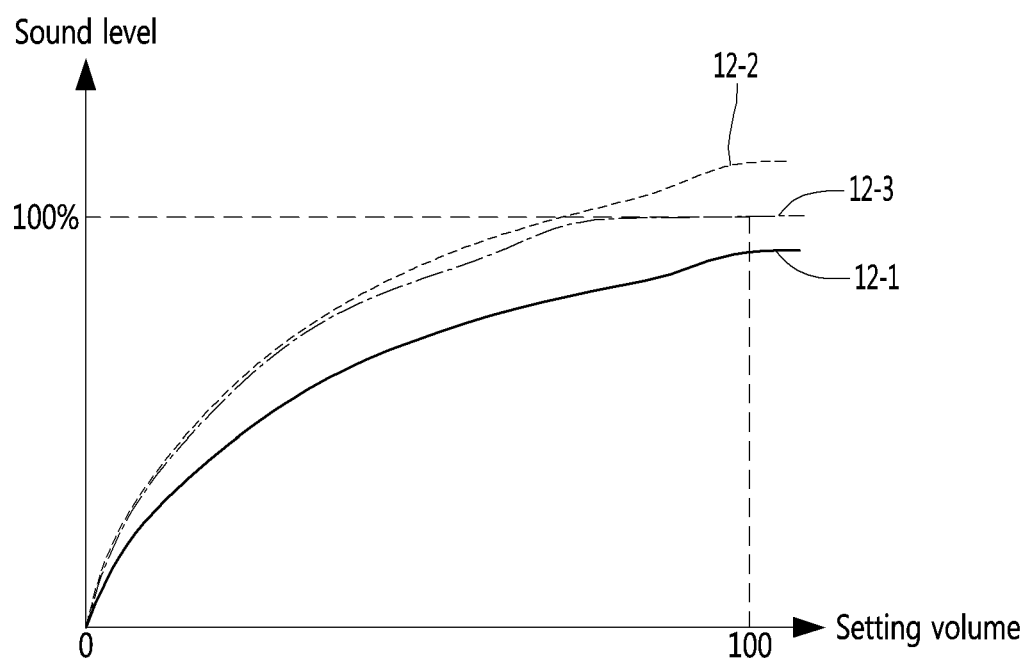
FIG. 12C is a view illustrating a method that the display device corrects the PCM curve, according to an embodiment of the present disclosure.

FIG. 12C is a view illustrating a method that the display device corrects the PCM curve, according to an embodiment of the present disclosure.

The controller 170 may change the PCM curve from a first curve 12-1 to a second curve 12-2. In this case, the output volume of the external speaker 300 may exceed the maximum volume (100%) in some section. In this case, the sound output from the external speaker 300 may be distorted and cracked. Accordingly, the controller 170 may correct the PCM curve such that the output volume becomes the maximum volume in the saturation section.

In other words, the controller 170 may correct the PCM signal such that the output volume of the external speaker 300 is equal to or less than the maximum volume when the PCM signal transmitted to the external speaker 300 is adjusted.

In addition, according to the present disclosure, when the PCM signal is adjusted, it is unnecessary to change and process the setting volume of the display device 100.

As described above, according to an embodiment of the present disclosure, the user may feel the optimal surround effect by properly adjusting the level of the sound output from the internal speaker and the level of the sound output from the external speaker.

In addition, the optimal surround effect may be provided regardless of the types and the installation environments of the external speakers.

In addition, the output volume of the external speaker may be adjusted to minimize the sound distortion and the degradation of the sound quality and to adjust the speaker balance or the surround balance.

In addition, the gain is applied to the PCM signal to adjust the level of the sound output from the external speaker even under the situation that the output volume of the external speaker is not adjusted, thereby adjusting the speaker balance or the sound balance.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
a display;
an internal audio output configured to output audio;
a wireless communication unit configured to communicate with a plurality of external audio output devices; and
a controller configured to display a screen for adjusting a first balance and a second balance,
wherein the first balance is a balance between audio output by the internal audio output and audio output by the plurality of external audio output devices, and
the second balance is a balance between audio outputs between the plurality of external audio output devices,
wherein the screen comprises a first control for changing the first balance independently from the second balance and a second control for changing the second balance independently from the first balance.

2. The display device of claim 1, wherein the controller is further configured to adjust the first balance by adjusting an output volume of the plurality of external audio output devices.

3. The display device of claim 2, wherein the controller is further configured to:
transmit, to the plurality of external audio output devices via the wireless communication unit, a signal for lowering the output volume of the plurality of external audio output devices such that a level of the audio output by the internal audio output is greater than a level of the audio output by the plurality of external audio output devices; and
transmit, to the plurality of external audio output devices via the wireless communication unit, a signal for raising the output volume of the plurality of external audio output devices such that the level of the audio output by the internal audio output is less than the level of the audio output by the plurality of external audio output devices.

4. The display device of claim 1, wherein the controller is further configured to adjust the first balance by adjusting a pulse code modulation (PCM) signal transmitted to the plurality of external audio output devices.

5. The display device of claim 4, wherein the controller is further configured to adjust the first balance by applying a gain to the PCM signal.

6. The display device of claim 4, wherein the PCM signal is adjusted when a volume setting of the plurality of external audio output devices is not adjustable.

7. The display device of claim 1, further comprising:
a memory configured to store a volume table in which a volume setting, a PCM control volume, and a PCM gain are mapped to each other, wherein the PCM control volume is based on the corresponding volume setting.

8. The display device of claim 7, wherein a plurality of volume tables is stored in the memory based on each type of external audio output device.

9. The display device of claim 1, wherein the controller is further configured to adjust a PCM signal transmitted to the plurality of external audio output devices such that an output volume of the plurality of external audio output devices is less than or equal to a maximum volume.

10. The display device of claim 1, wherein the controller is further configured to adjust output volumes of all of the plurality of external audio output devices based on a change to the first balance via the first control and adjust output volumes of a subset of the plurality of external audio output devices based on a change to the second balance via the second control.

11. A surround sound system comprising:
a plurality of external speakers; and
a display device in wireless communication with the plurality of external speakers,
wherein the display device comprises:
a display;
an associated audio output configured to output audio; and
a controller configured to display a screen for adjusting a first balance and a second balance,
wherein the first balance is a balance between audio output by the associated audio output and audio output by the plurality of external speakers, and
the second balance is a balance between audio outputs between the plurality of external speakers,
wherein the screen comprises a first control for changing the first balance independently from the second balance and a second control for changing the second balance independently from the first balance.

12. The display device of claim 11, wherein the controller is further configured to control the audio output by the plurality of external speakers to be decreased or increased compared to the audio output by the associated audio output in response to an input to the first control.

13. The display device of claim 11, wherein the second balance is a balance between a first external speaker and audio output by a second external speaker.

14. The display device of claim 13, wherein the first external speaker outputs audio corresponding to left side sound and the second external speaker outputs audio corresponding to right side sound.

15. The display device of claim 13, wherein the controller is further configured to control the audio output by the first external speaker to be increased greater as compared to the audio output by the second external speaker, or control the audio output by the second external speaker to be increased greater as compared to the audio output by the first external speaker, in response to an input to the second control.

16. The display device of claim 13, wherein the controller is further configured to adjust the second balance by adjusting output volume of at least one of the first external speaker or the second external speaker.

17. The display device of claim 13, wherein the controller is further configured to adjust the second balance by adjusting a gain of a PCM signal of at least one of the first external speaker or the second external speaker.

18. The display device of claim 13, wherein the controller is further configured to adjust the second balance when each of the first external speaker and the second external speaker have a different respective maximum power rating.

19. The surround sound system of claim 11, wherein the controller is further configured to adjust output volumes of all of the plurality of external speakers based on a change to the first balance via the first control and adjust output volumes of a subset of the plurality of external speakers based on a change to the second balance via the second control.

\* \* \* \* \*